UNITED STATES PATENT OFFICE.

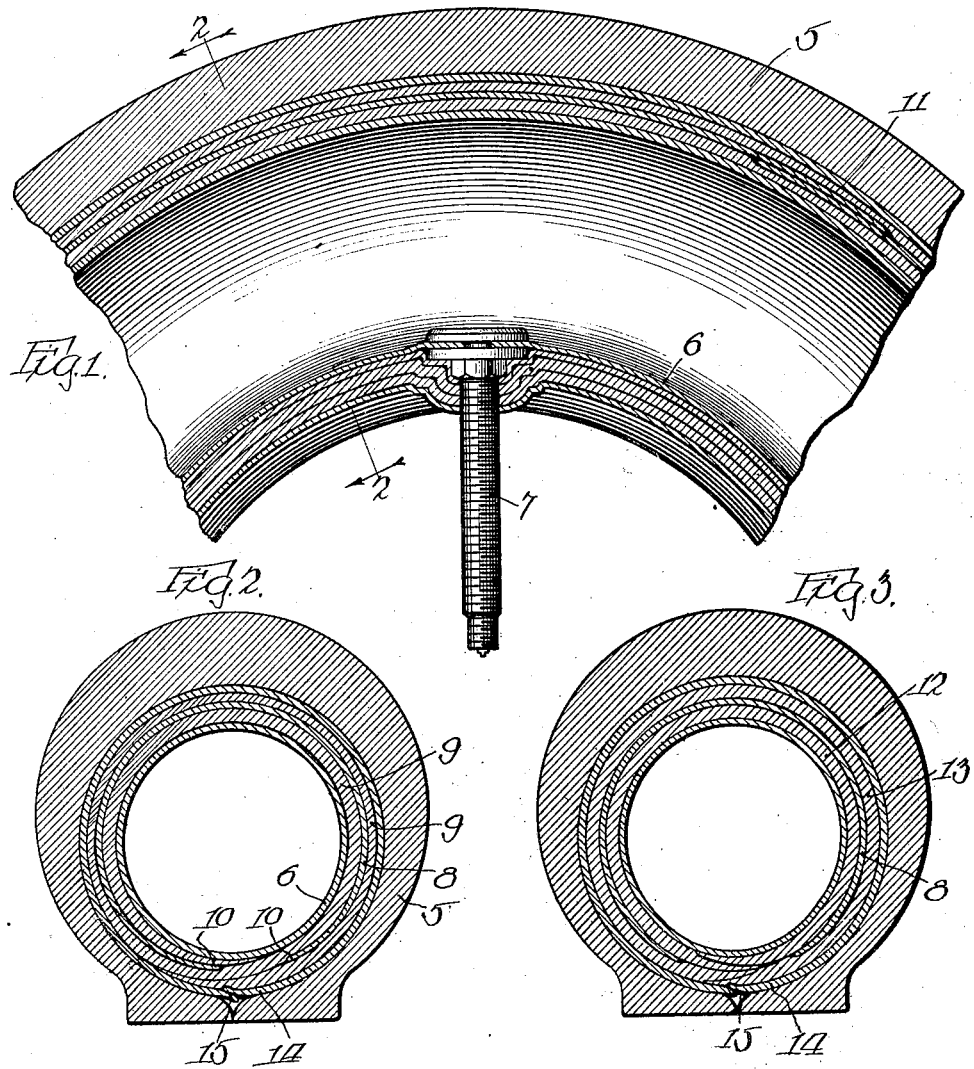

JAMES F. ROBINSON, OF MINNEAPOLIS, MINNESOTA.

VEHICLE-TIRE.

1,316,978.  Specification of Letters Patent.  Patented Sept. 23, 1919.

Application filed December 13, 1917. Serial No. 206,867.

*To all whom it may concern:*

Be it known that I, JAMES F. ROBINSON, a citizen of the United States, and a resident of the city of Minneapolis, in the county of Hennepin and State of Minnesota, have invented a certain new and useful Improvement in Vehicle-Tires, of which the following is a specification:

My invention relates to vehicle tire constructions and more particularly to protectors or reliners for inner tubes of such tire constructions.

The object of my improvement is the provision of a simple and efficient protecting means to be inserted between the inner tube and casing of a pneumatic vehicle tire for protecting the inner tube and giving long life to the tire construction.

A further object is the provision of a tire construction of the kind mentioned, which will prevent conducting excessive heats to the inner tube of the tire.

Other objects will appear hereinafter.

An embodiment of my invention is shown in the accompanying drawing forming a part of this specification, and in which, Figure 1 is a fragmental longitudinal section of a pneumatic vehicle tire embodying my invention, Fig. 2 is a cross section of the same taken on line 2—2 of Fig. 1, and Fig 3 is a view similar to Fig. 2, except that a modified construction is shown.

Referring more particularly to the drawing, I have shown an outer casing 5 and an inner tube 6 which may be of any ordinary or preferred construction. The inner tube 6 is provided with an air valve 7 also of any preferred or ordinary construction and secured to the tube 6 in any desired manner, such as that now ordinarly employed in the art.

Between the casing 5 and the inner tube 6, I provide a protector member 8 which may be of any comparatively hard, flexible material which will not puncture easily under ordinary circumstances. In practice, I have found that fiber serves this purpose admirably. The main requisites of this material are that the material must be flexible so as not to interfere with the flexibility of the tire and possess such lasting qualities as will not deteriorate or become broken in use.

I preferably insert a cushioning material 9 between the inner tube 6 and protecting member 8 and between the protecting member 8 and the casing 5. This cushioning material should be of heat insulating material so as to prevent the heats incident to the friction of the casing on road surfaces being communicated to the inner tube. This material 9 also cushions the inner tube so that the protector member will not chafe or abrade the inner tube in use. In this connection the longitudinal edges 10 of the protector member 8 are preferably rounded, as indicated clearly in the drawing, so that there will be no cutting edges.

The protecting member 8 may be made annular and bent in cross section, as indicated in Figs. 2 and 3, or it may be made of an elongated piece bent in cross section to the shape shown in Figs. 2 and 3, with the ends overlapped, as indicated at 11 in Fig. 1.

I preferably make the cushioning member 9 of a single elongated sheet, wrapping substantially one-half of it around the inner tube, then placing the protecting member 8 around this half of the cushioning member, and then wrapping the remaining portion of the cushioning member around the protector 8, as clearly indicated in Fig. 2. However, the cushioning member 9 may be made up of two annular members, one folded around the inner tube and the other folded around the protecting member 8, as clearly shown in Fig. 3, and as indicated by numerals 12 and 13. The particular form of the cushioning members 9, 12 and 13 may correspond to the desires of the manufacturers or users of the device.

I also preferably provide a covering 14 to envelop the inner tube 6, cushioning member 9 and protecting member 8, as clearly indicated in Figs. 2 and 3. This envelop 14 may be made of a sheet of thin rubber, or the like, placed around these parts with its edges secured together, as indicated at 15, Figs. 2 and 3, so as to form dirt-tight joints. This keeps the parts 6, 8 and 9 in proper relation and at the same time prevents foreign material coming in contact with them.

In some instances it may be desirable to leave out the cushioning and heat-nonconducting material 9 and place the protecting member 8 directly between the inner tube 6 and the casing 5. However, it will be apparent that the cushioning material 9 may be used also in conventional tires which are already in use by simply applying the cushioning member 9 and the protecting member 8 to any inner tube 6 already in use and then placing these parts in an ordinary casing which may have already been used.

While I have illustrated and described the preferred forms of construction, these are capable of variation and modification without departing from the spirit of the invention. I, therefore, do not wish to be limited to the precise details of constructions set forth, but desire to avail myself of such variations and modifications as fall within the scope of the appended claims.

I claim:

1. A vehicle tire comprising a casing; an inner tube in the casing; a fiber-protecting member between the casing and the inner tube having its longitudinal edges spaced apart; a cushion strip having one portion disposed between the casing and said member, a portion extending between the longitudinal edges of said member, and the remaining portion disposed between said member and the inner tube; and an envelop inclosing the inner tube, said member and cushion strip.

2. A vehicle tire comprising a casing; an inner tube in the casing; a fiber-protecting member between the casing and the inner tube having its longitudinal edges spaced apart; a cushion strip having one portion disposed between the casing and said member, a portion extending between the longitudinal edges of said member, and the remaining portion disposed between said member and the inner tube; and an elongated rubber covering sheet disposed around and inclosing the protecting member, inner tube and cushion strip with its edges secured together forming dirt-tight joints.

3. A vehicle tire comprising an inner tube; a cushion member of sheet material disposed in two convolutions around said inner tube; a fiber shield of sheet material disposed between the two convolutions of said cushion member, the latter having a portion extending between the longitudinal edges of said shield; and a thin flexible covering extending around and sealing up said inner tire, cushion member and fiber shield.

In testimony whereof I have signed my name to this specification this 10th day of December, A. D. 1917.

JAMES F. ROBINSON.